Aug. 14, 1928. Re. 17,066

R. M. SMYTHE

PIE PLATE

Original Filed Aug. 2, 1923

INVENTOR
RICHARD M. SMYTHE
BY Boresen & Schenck
ATTORNEYS

Reissued Aug. 14, 1928. Re. 17,066

UNITED STATES PATENT OFFICE.

RICHARD M. SMYTHE, OF BOONTON, NEW JERSEY, ASSIGNOR, BY MESNE ASSIGNMENTS, TO THE SAVE-ALL PIE PLATE CO., OF NEW YORK, N. Y., A CORPORATION OF NEW YORK.

PIE PLATE.

Original No. 1,568,696, dated January 5, 1926, Serial No. 655,238, filed August 2, 1923. Application for reissue filed January 7, 1928. Serial No. 245,223.

The baking of fruit pies has not heretofore been satisfactory, because of the juice boiling out between the top and bottom crusts, and not only becoming a loss, but also mussing the oven. Because of these discouraging difficulties the baking of fruit pies is but little practiced.

It has been the custom in the present art to insert through the crust a tubular paper or cardboard vent to tend to prevent the steam from forcing the juice out between the upper and lower crusts of the pie, with the resultant loss of juice and deterioration in the quality of the pie, and to reduce the annoyance of the dripping of the juice upon the hot stove or oven floor.

It is an object of the present invention to provide a pie plate of such construction and configuration as will overcome the foregoing difficulties without the necessity of resorting to the aforesaid venting means.

A further object of the invention resides in so constructing such a pie plate as will permit of the ready removal of the pie therefrom without mutilation.

Figure 1:
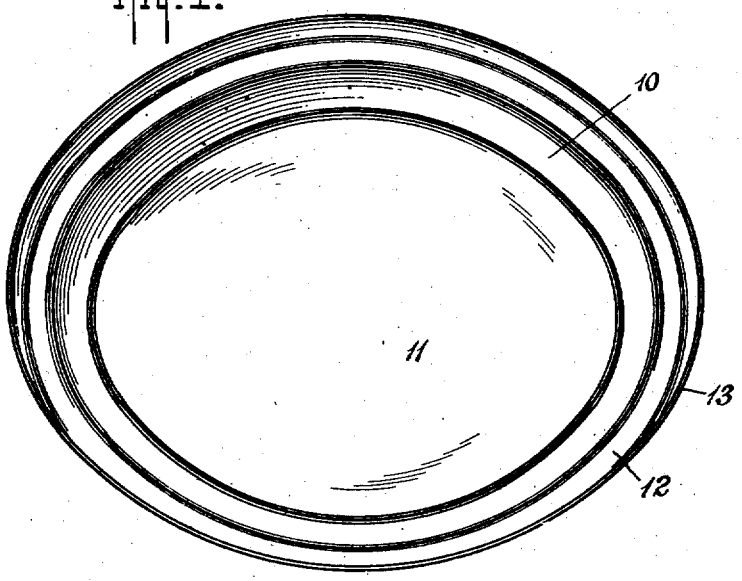
Figure 2:
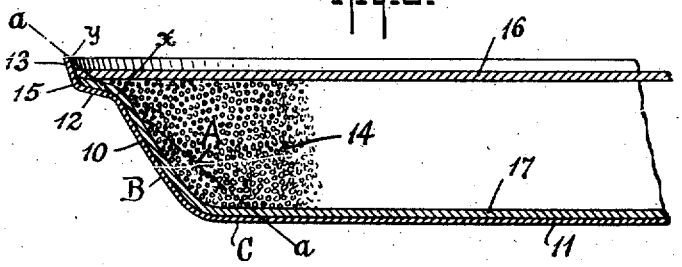
Figure 3:
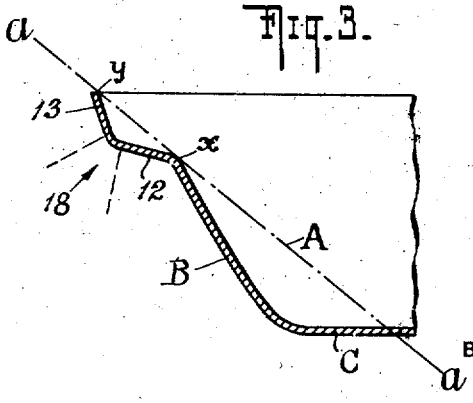

Other objects and advantages of the invention will be apparent from the following description when taken in connection with the accompanying drawings, in which:

Figure 1 is a perspective view of a pie plate constructed in accordance with the present improvements, Figure 2 is a sectional view of a portion thereof, and Figure 3 is a corresponding view of the same shown on a larger scale.

Referring to the drawings more in detail, the bottom of the pie plate is designated by the numeral 11 and its side wall shown as slightly concaved, by the numeral 10. A border ledge or brim 12 is merged at its inner edge with the upper edge of the side wall and has a slight upward inclination toward its larger periphery. A rim 13 extends upwardly from the outer edge portion of the ledge 12, said rim, in the preferred embodiment being flared outwardly to a slightly less extent than the side wall 10. The dimensions of the rim 13 and its angular disposition with respect to the ledge 12 is such as to permit close nesting of a stack of similar plates, to prevent fluid material exuded from the pie during baking from flowing over the free edge of said rim and to prevent the establishing of ready paths of flow of liquid over said edge of said rim, such as would be established if the rim, within the area of its juice-retaining region, were given a substantial degree of upward and outward curvature. The said free edge of the rim, as indicated at $y$, forms a peripherally disposed pivotal support for a knife blade. As more clearly indicated in Fig. 3 wherein the two dotted lines aid in identifying the location thereof, I prefer that the ledge or brim 12 and the rim 13 be run together by means of distinct fillet 18 and that the rim be inclined to a less extent than the side wall 10.

The border ledge or brim 12 preferably has a pronounced upward inclination and merges into the side wall 10 on a downwardly slanting convexly curved juncture zone, whence said side wall is continued downwardly and inwardly on a gradual slope. The ledge or brim 12 forms a seat for the peripheral portions of the lower crust and allows the pie-filling an opportunity to extend partly over said seat between the upper and lower crusts, thus producing a rim on the pie sufficient to confine the filling but without said rim being a dense mass of crust, such as is frequently found on pies. In the preferred form of the invention, the lower crust or dough therefor, taking the inclination of the ledge or brim 12, is engaged only at its outer edge portions by the upper crust, and the ledge or brim 12, by having the inward and downward inclination and by merging on a downwardly slanting convex curvature into the gradually sloping side wall 10, imparts to the pie a distinctive rim formation and enables the convenient removal of the pie from the plate. The pie plate is circular, as usual.

In Figure 2 of the drawing I have shown a bottom crust 17 in position with the filling 14 therein, the upper edge 15 of the lower crust resting on the brim portion 12 of the plate. At 16 is indicated the top crust of the pie having its outer edge attached in the usual manner to the edge 15 of the lower crust.

In the operation of the device, the dough having been rolled out, the pie plate is inverted over the sheet of dough and the upper crust cut therefrom. This disk will form the upper crust 16 of the pie, but, of course, is not put in place until after the lower crust is put in the plate and trimmed off around the edges in the well known manner. The filling 14 is then inserted and the upper crust applied, as indicated in Figure 2, with its edge in engagement with the edge 15 of the lower crust, both edges being united and supported on the brim or ledge 12.

Should any juices escape through the edges of the upper and lower crusts it will be obvious that they will be prevented from running onto the stove or oven floor by means of the rim 13 which will direct them backwardly onto the top of the pie.

By providing the slight depression or concavity in the wall 10 and by flaring outwardly the rim portion 13 and brim 12, it will be seen that this particular construction of pie plate will materially assist the removal of a pie without mutilation, inasmuch as the table knife downwardly directed in line with the rim may readily be inserted beneath the edges of the pie crust and then pass down below the body of the pie without damage thereto. As the knife is inserted beneath the edges of the pie crust by downward movement in line with the rim 13 the blade of the knife is automatically shifted inwardly by the ledge or brim 12 to the greater angle of the side wall 10 and the knife is then progressively advanced along the inner contour of the plate toward its center. The first effect will be to cause the edge of the pie crust to flex upwardly against the surface of the knife blade, until the blade reaches the position and assumes the angle necessary to enable it to follow the inner contour of the side wall 10. It is important that the degree of flexure of the crust during this part of the operation shall not reach the point at which the crust would break from the pie body and the conditions necessary for maintaining the coherence of the crust structure are provided for in my new pie plate by limiting the flexure of the crust to angles embraced within the middle range of acute angles. By the middle range of acute angles I mean to exclude angles which approximate a right angle or angles excessively acute, but I intend to include angles of the order of approximately 25° to 65°.

After the edges of the pie crust have been flexed as described, the knife advances downwardly along the surface of the side 10, and then along the bottom 11 of the plate, and, since the side wall slopes outwardly and upwardly from the bottom at an angle in the middle range of acute angles as heretofore described, the knife will at first follow the same direction, the result being that as the knife thereupon moves along the bottom 11, the pie body, acting like an element moving on a cammed surface, slides gradually upward along the blade. This sliding action begins as soon as the knife first starts its movement along the bottom and continues so long as the blade is advanced. It will be seen that during the advance of the blade along the bottom 11 the pivotal point of the blade, which initially was at $x$ (Fig. 2) has shifted to $y$. The point $x$ is, however, located, as shown, in such relation with the other elements of the plate that it becomes a pivotal support for the knife blade only when the blade exceeds an angle within the middle range of acute angles as described. This arrangement of the several elements constituting the plate makes it possible to remove the pie or a segment of pie from said plate without mutilation of the pie crust structure at any part thereof.

It will be observed that in the structure as described there is a co-ordination as between the bottom, the inclined side wall, the ledge, and the less inclined rim, with respect to their relative angular dispositions that a knife, when inserted and progressively advanced along the inner contour of the plate toward its center, will first cause the edge of the pie crust to flex upwardly to an angle not exceeding an angle within the middle range of acute angles, whereupon the pie body, as the knife advances, slides gradually upward along said knife, said sliding action beginning as soon as the knife first starts its movement along the bottom and continuing as the pivotal point of the knife changes from the line of juncture between the side wall and the ledge to the free edge of the rim.

It will be further observed, as clearly shown in Figs. 2 and 3, that the co-ordination of the structure is preferably such that the straight line $a$—$a$ forms an approximately triangular figure as between its portion A, the line B representing the side wall, and the line C representing that part of the bottom subtended by the angle formed by A and B. In this triangular figure the line B is intermediate in length as between the longer line A and the shorter line C. The line $a$—$a$ is obtained by drawing it, as a straight line, through the points $x$ and $y$.

It will be apparent from the drawing that the configuration and dimensions of the various components of the pie plate, as well as the co-ordination of these several components in the assembled structure, is such that each plate will nest closely, with substantially continuous surface contact, with pie plates of similar contour. This is an important consideration in that when the plates are made of metal as is common practice, they are shipped from the factory in nested relation. The weight of a column of plates is substantial and unless the plates are shaped and dimensioned not only to carry out their functions as pie-baking instrumentalities, but also their nesting function, they are likely to be bent or distorted in shipment.

I claim:

1. A pie plate comprising a circular bottom, a downwardly and inwardly sloping side wall, an upwardly and outwardly inclined border flange or brim extending from the upper portion of said side wall and an upwardly and outwardly flaring rim at the outer edge of said flange or brim, said inclined flange or brim merging into said side wall on a downwardly slanting convexly curved juncture zone, and said flange or brim and said rim being run together by means of a distinct fillet.

2. A pie plate having a substantially flat bottom merging into an upwardly and outwardly inclined side wall, said side wall terminating in an outwardly directed ledge or brim, and an upwardly and outwardly inclined rim formed in continuation with said ledge or brim, said rim being outwardly inclined to a less extent than said side wall, the relative inclinations being such that the blade of a table knife inserted flat against the inside surface of the rim will by a substantially vertical downward movement of the upper end be shifted inwardly by the ledge to the angle of the side wall, thereby to effect ready removal of the pie slices from the pan without mutilation.

In testimony whereof I have hereunto set my hand.

RICHARD M. SMYTHE.